United States Patent [19]

Arego et al.

[11] Patent Number: 5,202,950
[45] Date of Patent: Apr. 13, 1993

[54] BACKLIGHTING SYSTEM WITH FACETED LIGHT PIPES

[75] Inventors: Douglas A. Arego, Spring, Tex.; Kevin J. Hathaway, Menlo Park, Calif.; Richard M. Knox, Jr., Houston, Tex.; Gaylon R. Kornfuehrer, Cypress, Tex.

[73] Assignee: Compaq Computer Corporation, Houston, Tex.

[21] Appl. No.: 764,427

[22] Filed: Sep. 23, 1991

Related U.S. Application Data

[63] Continuation-in-part of Ser. No. 589,325, Sep. 27, 1990, Pat. No. 5,050,946.

[51] Int. Cl.$^5$ .............................................. G02B 6/00
[52] U.S. Cl. ........................................ 385/146; 385/33; 385/901; 385/129; 359/48; 359/50; 362/32
[58] Field of Search .................... 359/50, 48; 385/146, 385/33, 901, 129; 362/27, 31, 32, 309, 341, 260, 227

[56] References Cited

U.S. PATENT DOCUMENTS

| | | | |
|---|---|---|---|
| 4,914,553 | 4/1990 | Hamada et al. | 359/50 |
| 5,099,343 | 3/1992 | Margerum et al. | 359/48 |
| 5,123,077 | 6/1992 | Endo et al. | 385/901 |

FOREIGN PATENT DOCUMENTS

| | | | |
|---|---|---|---|
| 0210327 | 8/1990 | Japan | 359/50 |
| 0027908 | 4/1991 | Japan | |

*Primary Examiner*—Georgia Y. Epps
*Attorney, Agent, or Firm*—Christopher D. Keirs

[57] ABSTRACT

A light pipe used for backlighting liquid crystal displays has a planar front surface and a stair-stepped or faceted back surface. Light is injected from the ends of the light pipe from cold- or hot-cathode, apertured, fluorescent lamps. The cold-cathode lamps are preferably insulated to raise their operating temperature. The back surface has a series of planar portions parallel to the front surface connected by facets, which are angled so that the injected light reflects off the facets and through the front surface. A reflector having a planar, highly reflective, highly scattering surface or a sawtoothed or grooved upper surface in located adjacent to and parallel with the light pipe back surface to reflect light escaping from the back surface back through the light pipe to exit the front surface. The axis of grooves is preferably slightly skewed from the facet axis to reduce moire pattern development. A low-scattering or low-loss diffuser is located adjacent to and parallel with the light pipe front surface to reduce moire pattern development. The liquid crystal display is located over the low scattering diffuser. A separate injector may be located between the lamp and the light pipe to better couple the light into the light pipe. Light pipes may be stacked to provide a backlight system having increased brightness and/or greater viewing angle.

7 Claims, 10 Drawing Sheets

FIG. 22

BACKLIGHTING SYSTEM WITH FACETED LIGHT PIPES

This application is a continuation-in-part of copending application Ser. No. 07/589,325 filed Sep. 27th, 1990, U.S. Pat. No. 5,050,946.

BACKGROUND OF THE INVENTION

1. Field of the Invention

The present invention relates to backlighting systems used with liquid crystal displays, and more particularly to light pipe systems.

2. Description of the Related Art

Liquid crystal displays (LCD's) are commonly used in portable computer systems, televisions and other electronic devices. An LCD requires a source of light for operation because the LCD is effectively a light valve, allowing transmission of light in one state and blocking transmission of light in a second state. Backlighting the LCD has become the most popular source of light in personal computer systems because of the improved contrast ratios and brightness possible. Because conventional monochrome LCD's are only approximately 12% transmissive and color LCD's are only approximately 2% transmissive, relatively large amounts of uniform light are necessary to provide a visible display. If power consumption and space were not of concern, the necessary level and uniformity of backlight could be easily obtained.

However, in portable devices power consumption (which directly effects battery life) and space are major concerns. Thus, there is a need to obtain a sufficiently uniform and bright backlight level with as little power as possible in as little space as possible at, of course, the lowest possible cost.

Numerous designs exist which trade off various of these goals to achieve a balanced display. Several of these designs, such as light curtains and light pipes, are shown in the drawing figures and will be described in detail. Such designs generally trade off uniformity of backlighting for space or power efficiency. These designs utilize various scattering means and a final diffuser before the light is presented to the LCD. The scattering means and the diffusers both contribute to loss of light and thus reduce the efficiency of the transfer of light from the light source to the LCD. While the designs are adequate in some cases, the demands for longer battery life with monochrome LCD's or adequate battery life with color LCD's are present, as is a desire for the use of less space.

SUMMARY OF THE INVENTION

The present invention is a faceted, parallel-surface light pipe design. Light sources, preferably reflector or apertured fluorescent lamps, but alternatively uniform lamps, supply light to one or both ends of a light pipe. The front surface of the light pipe, on which is positioned a low loss diffuser, which in turn is in contact with the LCD, is planar, while the back surface of the light pipe is generally parallel to the front surface, but has a stair-stepped or faceted surface. The facets are preferably formed at an angle such that light injected into the ends of the light pipe is reflected off the facets and through the front surface. The pitch or step length of the facets is such that the faceting structure is not visible to the unaided eye. The step height of the facets is preferably in the micron range and may increase with the distance from the lamp. A planar, white, diffuse reflector, which is highly reflective and high scattering, is positioned parallel to the back surface of the light pipe. This allows light leaving the back surface to be reflected back through the front surface of the light pipe. Alternatively, the reflector can have a sawtoothed or grooved surface. The axis of the sawtooth ridges is preferably slightly askew the axis of the facets to reduce the effects of moire pattern development. The reflections can be satisfactorily controlled so that little light is returned to the light source, little light leaves the other end of the light pipe and little light is trapped in the light pipe.

This design is in contrast to the low efficiency of the various scattering techniques of the prior art which allow the losses described above. The pitch and step height are sufficient so that a conventional diffuser is not required before light enters the LCD, thus allowing further relative increased light transmission and efficiency. However, a low-loss diffuser is preferably located between the light pipe and the display to overcome moire pattern development. Various designs of the end of the light pipe and the actual facet profile and pitch can be used to alter specific aspects of the transmission to vary the light output.

BRIEF DESCRIPTION OF THE DRAWINGS

A better understanding of the prior art and the present invention can be obtained when the following detailed description of the preferred embodiment is considered in conjunction with the following drawings, in which.

DETAILED DESCRIPTION OF THE PREFERRED EMBODIMENT

Prior to discussing the present invention, it is considered appropriate to further discuss various designs in the prior art to explain the present technology and thus make clear the scope of the present invention.

Figure 1:
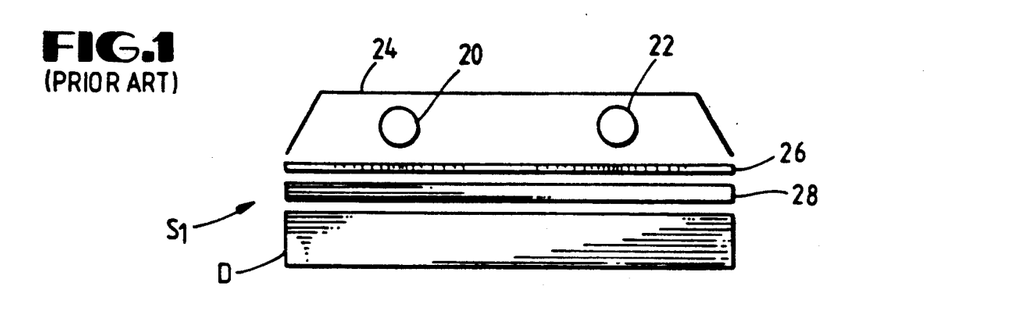
FIGS. 1–4 are views of various backlighting systems of the prior art.

FIG. 1 generally discloses a conventional light curtain system used in providing backlight to an LCD. Two uniform-output, cold cathode fluorescent lamps 20 and 22 are the basic light source for the system S1. A reflector 24 generally having a white reflective surface facing the lamps 20 and 22 is used to redirect the light being emitted by the lamps 20 and 22 in directions other than towards the LCD D. A light-blocking layer 26 is used to reduce any hot, nonuniform spots which would occur directly over the lamps 20 and 22 to provide a first level of uniformity to the light. The blocking layer 26 is preferably formed of a variable opacity mylar material, with the material being very opaque near the lamps 20 and 22 and becoming more translucent or transparent away from the lamps. This variable opacity is generally provided by a printed pattern on the surface of the blocking layer 26. However, because the light is not sufficiently uniform after passing through the blocking layer 26, a diffuser 28, which is generally a translucent plastic material, is used to further diffuse the light and produce a more uniform display. However, the diffuser generally reduces the light transmission by approximately 10% to 50%, which greatly reduces the efficiency of the overall backlighting system S1. The light curtain system S1 is relatively thick and as the lamps are placed closer to the blocking layer, alignment problems increase, reducing the capability to economically manufacture the system S1.

Figure 2:
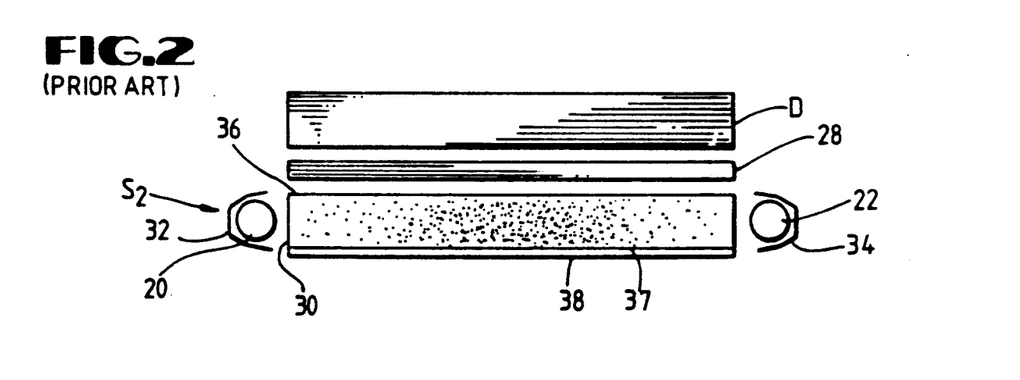
Figure 3:
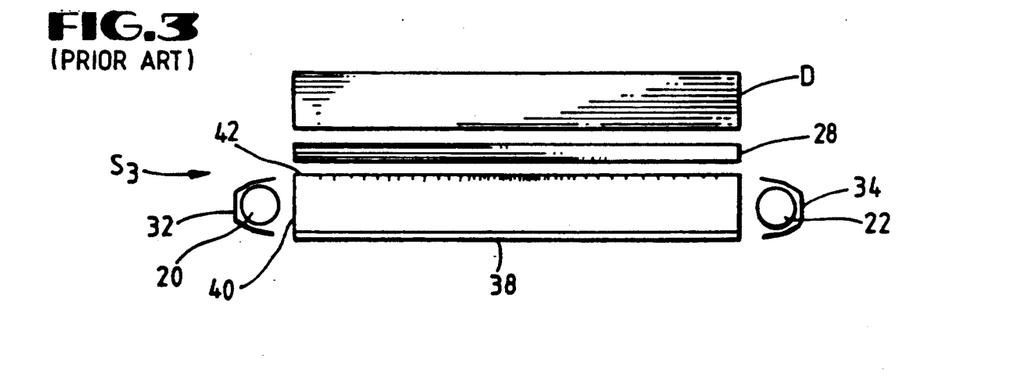

Two variations of similar light pipe systems are shown in FIGS. 2 and 3 and are generally referred to as systems S2 and S3. Both systems again generally use uniform emission lamps 20 and 22, but the lamps are located at the ends of a light pipe 30. White reflectors 32 and 34 are provided around the lamps 20 and 22 so that the uniform light is directed into the light pipe 30. The light pipe 30 includes a variable-density scattering structure so that the light is projected out the front surface 36 of the light pipe 30, through the diffuser 28 and through the LCD D. In the backlighting system S2 the light pipe 30 uses titanium oxide particles or other particles located in the light pipe 30 to perform the scattering function. Preferably the density of the particles is greater near the center of the display and lesser near the ends of the display near the lamps 20 and 22 to produce a uniform light because of the effective light density, which reduces approaching the center of the light pipe 30. A mirrored or fully reflective surface 38 is applied to the back surface 37 of the light pipe 30 so that any light which is scattered in that direction is reflected in an attempt to have the light transmitted through the front surface 36 of the light pipe 30. However, this light might again be scattered and so various losses can occur. The back-lighting system S3 uses a scattering structure printed on the front surface 42 of the light pipe 40 to provide the scattering effect. In both system S2 and S3 a diffuser 28 is required to provide a sufficiently uniform light source to the LCD D. In these designs, light can become trapped in the light pipe 40 and can readily be transmitted from one end to the other and thus be lost, reducing overall efficiency.

Figure 4:
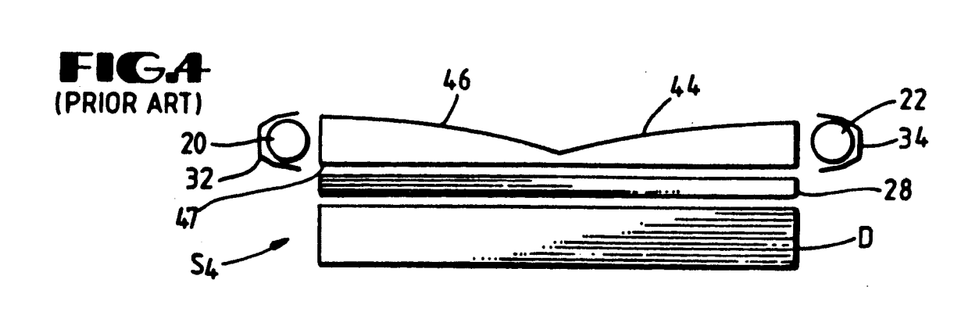

An alternative prior art light pipe design is shown in FIG. 4 and is generally referred to as S4. In this case, a double quadratic wedge light pipe 44 is used in contrast to the parallel light pipes 30 and 40 of the systems S2 and S3. The back surface 46 of the light pipe 44 is a relatively constant, diffuse surface with the front surface 47 being a clear or specular surface. The curve formed by the back surface 46 is a quadratic curve such that more light which impinges on the back surfaces is reflected through the front surface as the light approaches the center of the light pipe 44. In this way a relatively uniform light source can be developed, but a diffuser 28 is still required to provide an adequately uniform source. This design has problem in that some light does leak out at low angles out the back and in some cases light is sent back to the source. Additionally, there are some problems at the exact center of the display.

Thus, while the light pipe designs S2, S3 and S4 are generally thinner designs than the light curtain system S1, they have problems related to having to turn the light generally ninety degrees and thus have a lower efficiency than the light curtain design, which in turn has the drawback of being a relatively thick design which limits the design possibilities in portable computer systems and television applications.

Figure 5:
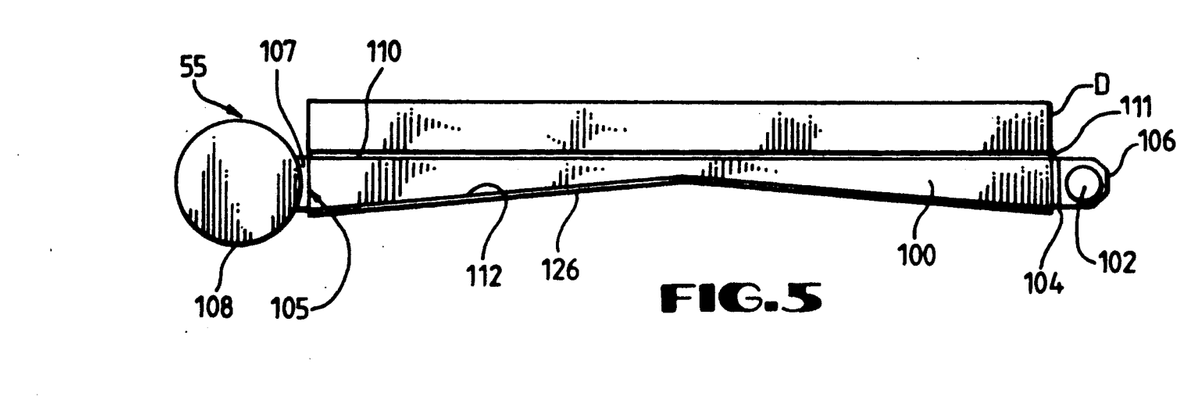
FIG. 5 is a view of a backlighting system according to the present invention including a light pipe and light sources.

A backlight system according to the present invention, generally referred to as S5, is shown in FIG. 5. A faceted, dual-source light pipe 100 is coupled to an LCD D. FIG. 5 shows two alternative lamp variations. In one variation, a uniform dispersion lamp 102 may be located adjacent to an optional separate injector 104. The lamp 102 is preferably surrounded by a reflector 106. The separate injector 104 is used to couple the transmitted light from the lamp 102 into the light pipe 100. The second and preferred embodiment of the light source is a lamp 108 which is a cold-cathode, reflector fluorescent lamp having an aperture located adjacent to the end 105 of the light pipe 100. A reflector 106 may be used with the lamp 108. For use with monochrome displays D, a cold cathode lamp is preferred to keep power consumption at a minimum, the backlight S5 being sufficiently efficient that the added light output is not considered necessary. However, if a color display D is used, a hot-cathode lamp is preferred because of the need for maximum light output. Additionally, a reflector lamp is preferred to an aperture lamp for lamps of the diameter preferably being used in the preferred embodiment. A reflector lamp has a first internal coating of the reflective material, which then has an aperture developed and is finally completely internally coated with phosphor. The aperture lamp is first coated internally with the reflective material, then with the phosphor and finally the aperture is developed. Given the relatively large arc of the aperture, the additional phosphor present in the reflector lamp more than offsets the lower brightness because the light must travel through the phosphor coating the aperture. An index-matching material 107 may optionally be provided between the lamp 108 and the light pipe 100.

As shown the upper surface of the light pipe 100 is planar, specular and is adjacent a low trapping and low scattering diffuser 111. The diffuser 111 preferably produces less than 10% brightness drop and in used to reduce the effects of any moire pattern developed between the light pipe 100 and the LCD display D because of the pitch and alignment variations between the items. The LCD display D is located over the diffuser 111. A back surface reflector 126 is located parallel to the back surface 112 of the light pipe 100 to reflect light through the back surface 112 back through the light pipe 100 and out the front surface 110. In the macroscopic view of FIG. 5, the back surface 112 of the light pipe 100 appears to be a straight wedge or planar surface but in the enlarged views shown in FIGS. 6 and 7 the stair-stepped or faceted structure is clearly shown.

Figure 6:
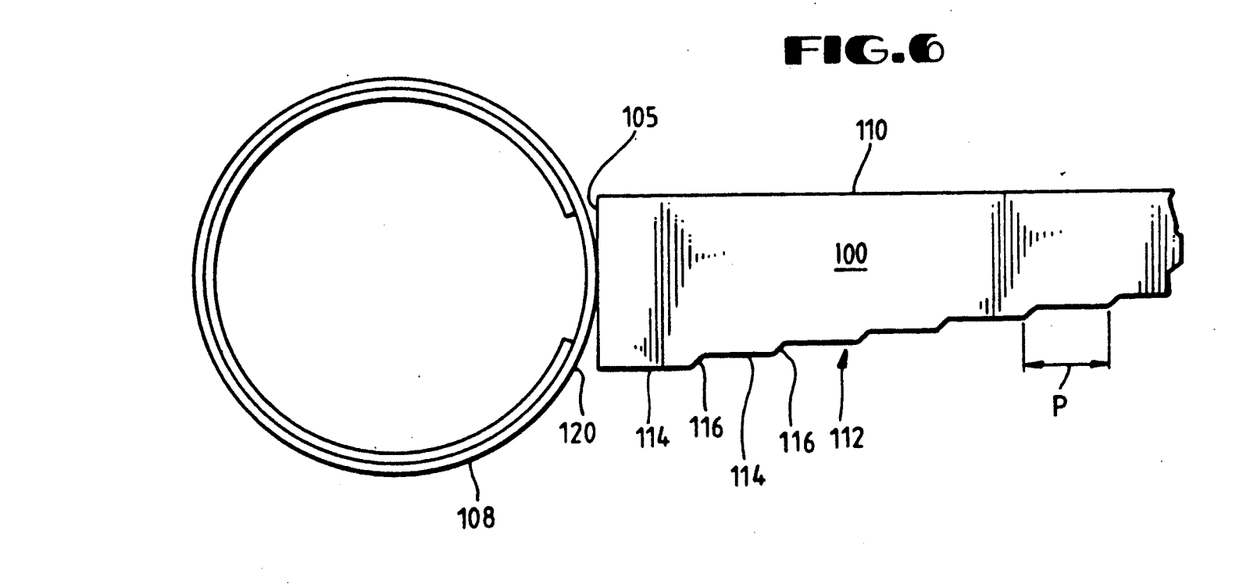
FIGS. 6 and 7 are greatly enlarged views of portions of the backlighting system of FIG. 5.
Figure 7:
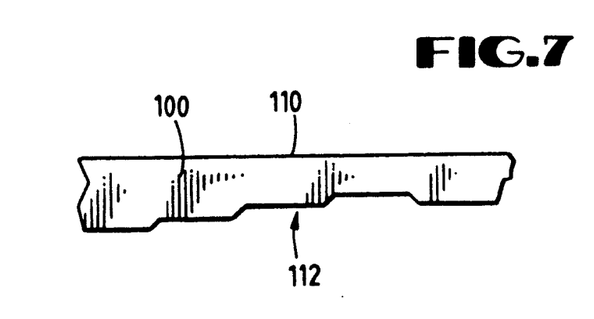
Figure 11:
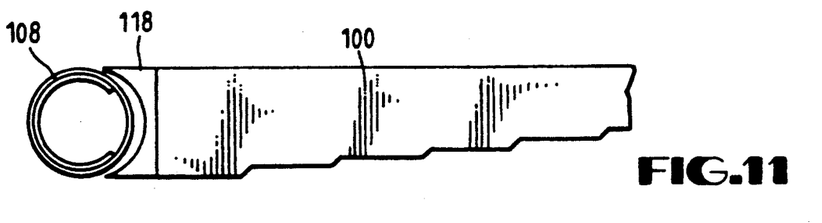
FIG. 11 is a greatly enlarged view of an alternative injector according to the present invention.

The back surface 112 consists of a series of portions 114 parallel with the front surface 110, with a series of facets 116 leading to the next parallel portion 114. FIG. 6 is the enlarged view showing the coupling of the apertured lamp 108 with the light pipe 100, while FIG. 7 shows the central portion of a dual source light pipe 200. Preferably the lamp 108 is a fluorescent type lamp with an aperture height approximating the thickness of the light pipe 100. The light pipe 100 preferably has a thickness of 5 mm or less at the outer edges and a thickness of 1 mm in the center. The thickness of 1 mm is preferred because the light pipe 100 is preferably made of polymethyl methacrylate (PMMA) and this minimum thickness is provided for reasons of mechanical strength. Other materials which can develop and maintain the faceted structure may be used to form the light pipe 100. The light pipe 100 is restrained to a thickness of approximately 5 mm so that when combined with the LCD D, the reflector 126, and the diffuser 111 of the preferred embodiment, the overall unit has a thickness of less than ¼ inch, exclusive of lamp 108, thus saving a great deal of space as compared to prior art light curtain designs. The lamp 108 can have a diameter greater than the thickness of the light pipe 100, allowing a narrower aperture as shown in FIGS. 5 and 6, or preferably can have a diameter approximately equal to the thickness of the light pipe 100 as shown in FIGS. 5 and 11, with an angularly larger aperture.

Figure 14:
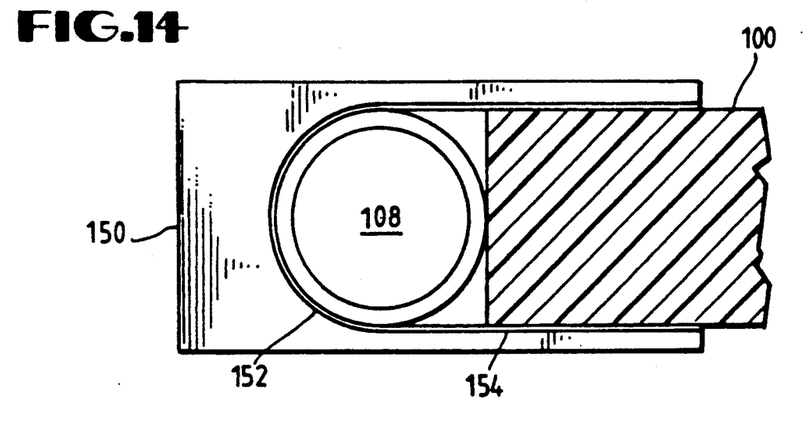

If the preferred cold cathode lamp is used as the lamp 108, the lamp 108 may run at temperatures below the optimum efficiency temperature because of the small size of the lamp 108. Therefore, it is preferable to use a reflector 106 which is also insulating. Four alternative embodiments are shown in FIGS. 14–17. In the embodiment of FIG. 14, a U-shaped insulator 150 is used. Inside the insulator 150 and before the light pipe 100 can be a white reflective material 152. This material 152 can be adhesively applied if needed, but preferably the insulator 150 is formed of a white, reflective material. The presently preferred material is a high density polystyrene foam, but silicone, polyethylene, polypropylene, vinyl, neoprene or other similar materials can be used. A double-sided adhesive layer 154 is used to retain the insulator 150 to the light pipe 100. The insulator 150 traps the heat produced by the lamp 108, thus raising the lamp operating temperature and, as a result, its efficiency. It is desirable that the insulator 150 and associated materials be able to withstand 100 degrees Celsius for extended periods and provide at least moderate resistance to fire.

Figure 15:
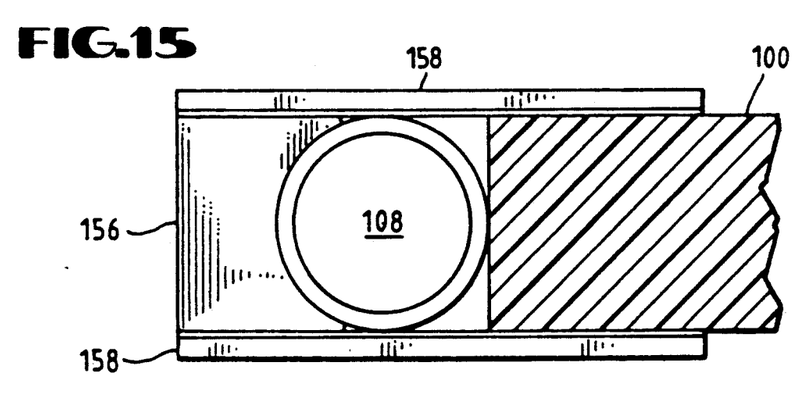
Figure 16:
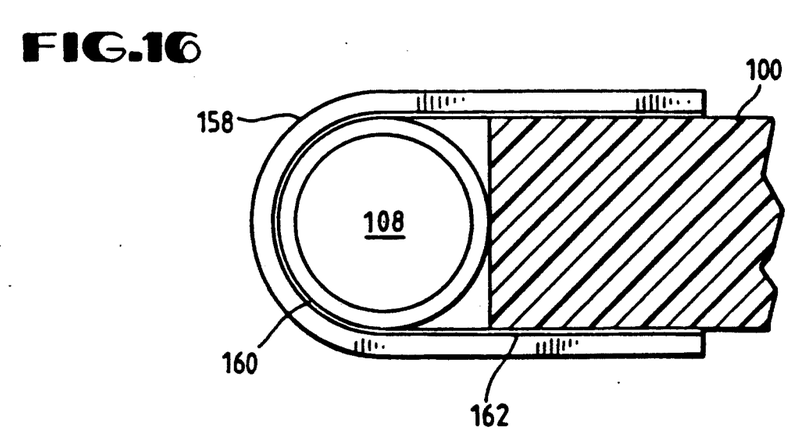

In the variation shown in FIG. 15, an expanded polystyrene block 156, or similar material, is combined with two strips of foam tape 158 to form the insulating reflector 106. Preferably the adhesive surface of the tape 158 includes a mylar backing for strength. In the variation illustrated in FIG. 16, foam tape 158 is again used, but in this case longitudinally with the lamp 108 to form a U shape. Preferably, the inside of the U is covered by a reflective tape 160, while the foam tape 158 is fixed to the light pipe 100 by a double-sided metallized mylar tape 162.

Figure 17:
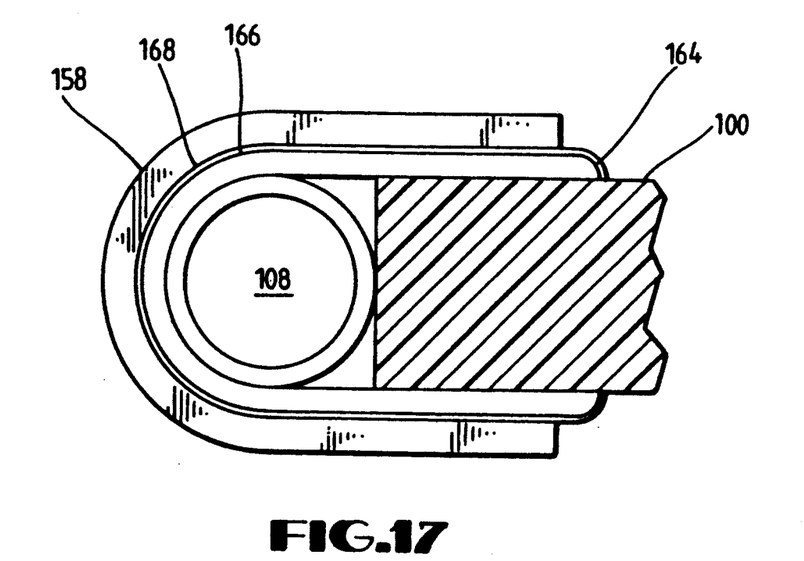

Yet another variation is shown in FIG. 17. A clear acrylic material 264 surrounds the lamp 108 and is attached to the light pipe 100 by a suitable adhesive layer. The outer surface 166 of the acrylic material 164 is coated with metallizing material 168 so the outer surface 166 is a reflector. In this manner, light which is emitted from the lamp 108 at locations other than the aperture is reflected through the acrylic material 164 into the light pipe 100, instead of through the lamp 108 as in FIGS. 14 through 16. While the acrylic material 164 will provide some insulation, it may not be sufficient to raise the temperature of lamp 108 as desired and thus foam insulating tape 158 may be used over the acrylic material 164 for better insulation. In this case the entire inner surface of the foam tape 158 may be adhesive coated as the reflective layer is present on the acrylic material 164.

A separate injector 104 may be used to couple the light being emitted by the lamp 108 into the light pipe 100, but preferably the end 105 of the light pipe 100 is considered the injector. The injector 104 or end 105 is preferably a flat surface which is polished and specular, that is non-diffuse, and may be coated with anti-reflective coatings. A flat, specular surface is preferred with a light pipe material having an index of refraction greater than 1.2, which results in total internal reflection of any injected light, which the facet structure will project out the front surface 110.

Several other alternatives are available for the injector, such as index matching material 107 to match the lamp 108 to the light pipe 100 to eliminate surface reflections. The index matching material 107 is a clear material, such as silicone oil, epoxy or polymeric material, which contacts both the lamp 108 and the end 105. Alternatively, the injector 118 can be shaped to conform to the lamp 108 with a small air gap (FIG. 11). This curved surface of the injector 118 helps locate the lamp 108. Additionally, a cylindrical Fresnel lens can be formed on the end 105 or separate injector 104 to help focus the light being emitted from the lamp 108. Its noted that a cylindrical Fresnel lens is preferred over a true cylindrical lens to limit leakage of the light. Alternate lenses can be developed on the separate injector 104 or end 105 which in combination with the facets 116 can effect the output cone of the light as it exits the light pipe 100. Preferably the output cone is the same as the viewing angle of the LCD D so that effectively no light is being lost which is not needed when viewing the LCD D, thus increasing effective efficiency of the system.

Figure 8:
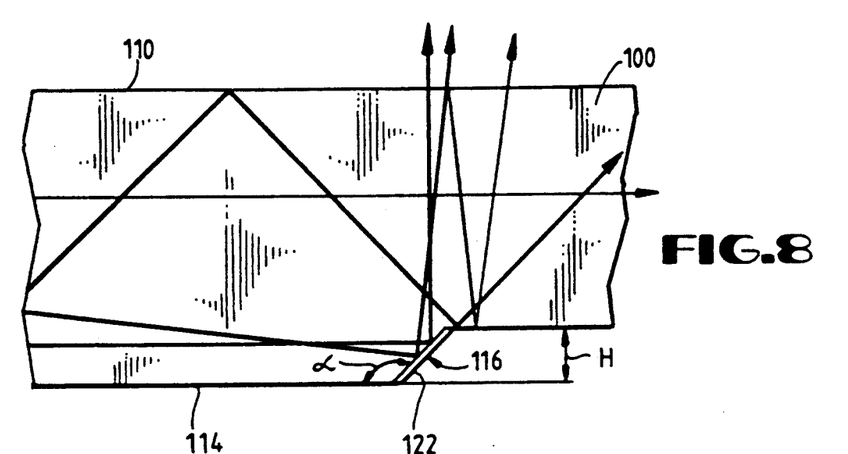
FIGS. 8, 9A, 9B and 10 are greatly enlarged views of portions of the light pipe of FIG. 5 showing light action.

FIG. 8 shows a greatly enlarged view of a portion of one facet 116 and several parallel portions 114 of the light pipe 100. As can be seen in this illustration, the parallel back surface portions 114 are parallel with the front surface 110, both of which are specular, so that the light pipe 100 preferably utilizes only specular reflections and does not utilize diffuse reflection or refraction, except in minor amounts. By having primarily only specular reflections it is possible to better control the light so that it does not leave the light pipe 100 in undersired directions, thus allowing better focusing and less diffusion. Thus, the basic propagation media of the light pipe 100 is that of a parallel plate light pipe and not of a wedge or quadratic. The facet 116 preferably has an angle alpha of 135 degrees from the parallel portion 114. This is the preferred angle because then light parallel to the faces 110 and 114 is transmitted perpendicular to the light pipe 100 when exiting the front face 110. However, the angle can be in any range from 90 to 180 degrees depending upon the particular output characteristics desired. The pitch P (FIG. 6) or distance between successive facets 116 is related to and generally must be less than the visual threshold of the eye which, while proportional to the distance the eye is from the LCD D, has preferred values of 200 to 250 lines per inch or greater. In one embodiment without the diffuser 111 the pitch P is varied from 200 lines per inch at the ends of the light pipe 100 near the lamps 108 to 1000 lines per inch at the center so that more reflections toward the front face 110 occur at the middle of the light pipe 100 where the light intensity has reduced. The pitch in the center is limited to 1000 lines per inch to provide capability to practically manufacture the light pipe 100 in large quantities, given the limitations of compression or injection molding PMMA. If the diffuser 111 is utilized, the pitch can go lower than 200 lines per inch because of the scattering effects of the diffuser 111. The limit is dependent on the particular diffuser 111 utilized. Thus, the use of the diffuser 111 can be considered as changing the limit of visual threshold. In one embodiment of the present invention, the facet height H (FIG. 8) ranges from approximately 1 micron near the end 105 to 10 microns near the middle, the farthest point from a lamp. In the drawings, the facet height is greatly enlarged relative to the pitch for illustrative purposes. The preferred minimum facet height is 1 micron to allow the light pipe 100 to be developed using conventional manufacturing processes, while the preferred maximum facet height is 100 microns to keep overall thickness of the light pipe 100 reduced. It is noted that increasing the facet height of a facet 116 at any given point will increase the amount of light presented at that point, referred to as the extraction efficiency, so that by changing the pitch P, facet height H, and facet angle alpha, varying profiles and variations in uniformity of the light output from the front surface 110 can be developed as needed.

While the desire is to use purely specular reflective effects in the light pipe 100, some light will be split into transmitted and reflected components. Even though there is total internal reflection of light injected into the light pipe 100 by the front surface 110 and parallel portions 114, when the light strikes a facet 116 much of the light will exceed the critical angle and develop transmitted and reflected components. If the light is reflected from the facet 116, it will preferentially be transmitted through the front surface 110 to the viewer. However, the transmitted component will pass through the back surface 112. Thus a reflective coating 122 may be applied to the facet 116. This reflective material 122 then redirects any light transmitted through the facet 116. This is where the greatest amount of transmission is likely to occur because of the relatively parallel effects as proceeding inward on the light pipe 100.

Figure 10:
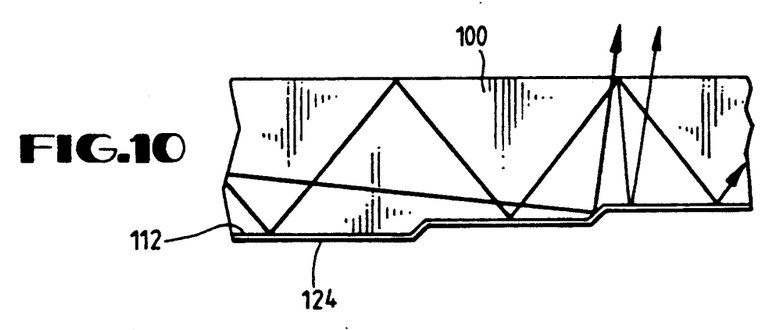

A design trade-off can be made here based on the amount of light exceeding the critical angle being reflected back from the front surface 110, through the back surface 112 or through the facets 116. If there is a greater amount of this light which will be transmitted out the back surface 112 and lost, it may be desirable to fully coat the back surface 112 as shown in FIG. 10 so that the entire back surface 112 is coated by a reflector material 124. Because the reflector material is preferably aluminum or a similar metal, the efficiency of the reflector 124 is not 100% but typically in the range of 80% to 90%, some reflective loss occurs at each point. Thus, there is some drop in efficiency each time the light impinges on the reflector 124, but based on the amount of high angle light present, more light may actually be transmitted through the front surface 110, even with the reflective losses. If the lamp transmits much more parallel light, then coating the parallel portions 114 with reflective material may not be necessary.

Figure 9A:
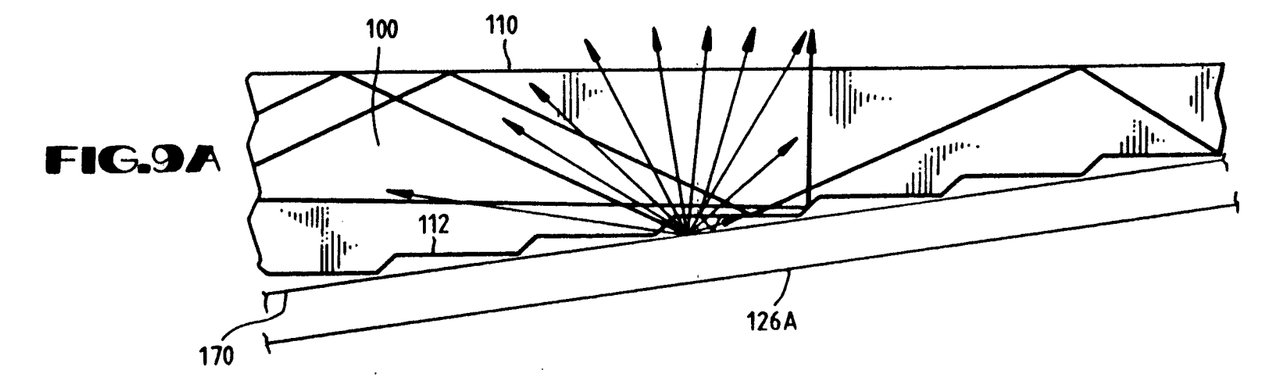
Figure 9B:
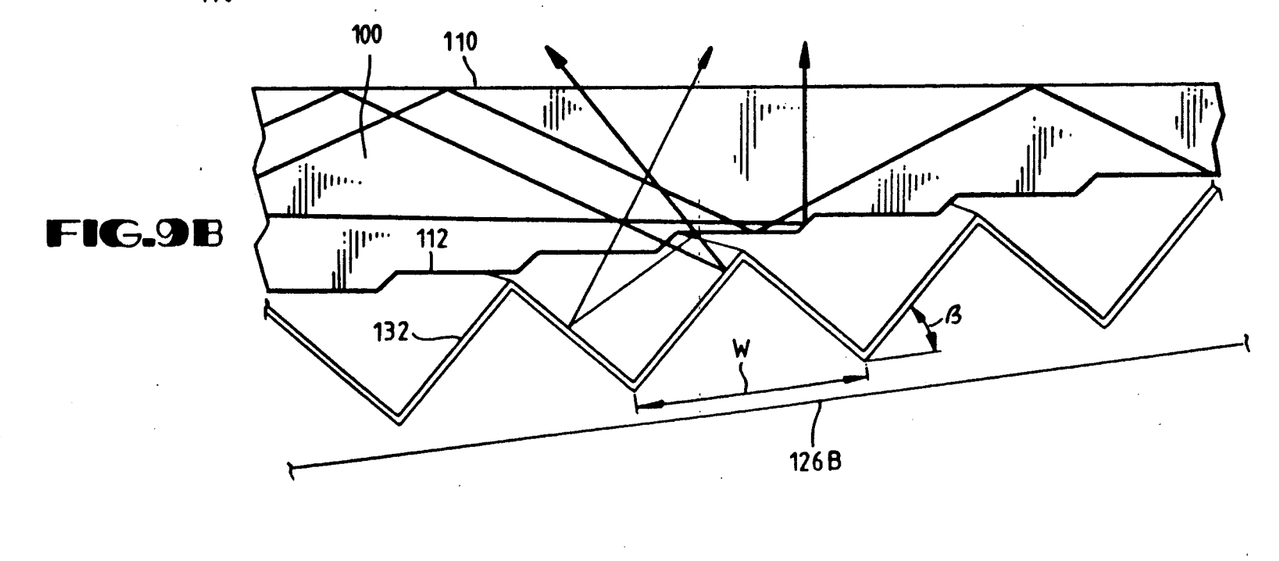

In the embodiments shown in FIGS. 9A and 9B, no reflective coatings are actually applied to the light pipe 100 but instead, a reflector plate 126A or 126B is located adjacent the back surface 112 of the light pipe 100. In the preferred embodiment shown in FIG. 9A, the reflector plate 126A is planar and has a white and diffuse surface 170 facing the back surface 112 of the light pipe 100. The surface 170 is highly reflective and high scattering to reflect the light passing through the back surface 112 back through the light pipe 100 and out the front surface 110. The thickness of the reflector plate 126A is as needed for mechanical strength.

In an alternative embodiment shown in FIG. 9B, the front or light-pipe-facing surface 132 of the reflector plate 126B has a sawtoothed or grooved surface, with the blaze angle beta of the sawtooth being in the range of 30 to 60 degrees, with the preferred angle being approximately 40 degrees. The pitch W of the sawteeth is different from the pitch P of the light pipe facets to reduce the effects of moire pattern development between the light pipe 100 and the reflector 126B. The pitches are uniform in the preferred embodiment and are in the range of 1-10 mils for the facets and 1-10 mils for the reflector grooves, with the preferred facet pitch P being 6 mils and the sawtooth pitch W being 4 mils. The sawtooth pitch W can be varied if the facet pitch P varies, but a constant pitch is considered preferable from a manufacturing viewpoint. The thickness of the reflector plate 126B is as needed for mechanical support.

Additionally, the longitudinal axis of the sawtooth is slightly rotated from the longitudinal axis of the facets to further reduce the effects of moire pattern development. The sawtooth surface 132 is coated with a reflecting material so that any impinging light is reflected back through the light pipe 100 as shown by the ray tracings of FIG. 9. Further, the sawtooth can have several different angles between the preferred limits to better shape the light exiting the light pipe 100.

The majority of the light which impinges on the sawtooth surface 132 or the diffuse surface 170 will proceed directly through the light pipe 100 and emerge from the front face 110 because the light pipe 100 is effectively a parallel plate because the facet area is only a very small percentage as compared to the flat portion of the back surface 112. Thus, the light which exits the back surface 112 of the light pipe 100 is reflected back through the light pipe 100 to exit the front surface 110 and contribute to the omitted light with little loss.

Figure 12:
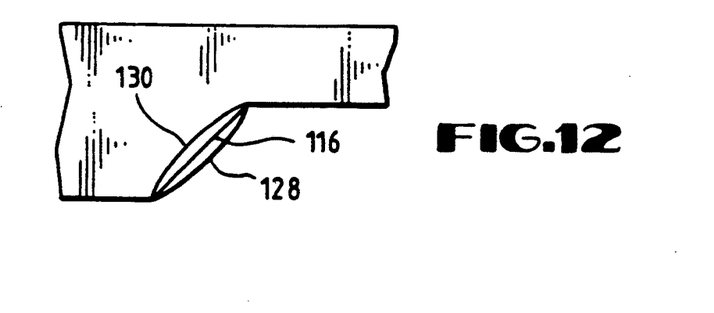
FIG. 12 is a greatly enlarged view of a facet of the light pipe of FIG. 5.

Additionally, the actual facet profile 116 is not necessarily planar. As shown in FIG. 12, the actual facet profile may be slightly concave 128 or slightly convex 130. The facets 116 then form a lenticular array and can be curved as desired to help tailor the output profile of the light cone. Additionally, the facet 116 surface may be roughened to increase scattering if desired.

Figure 13:
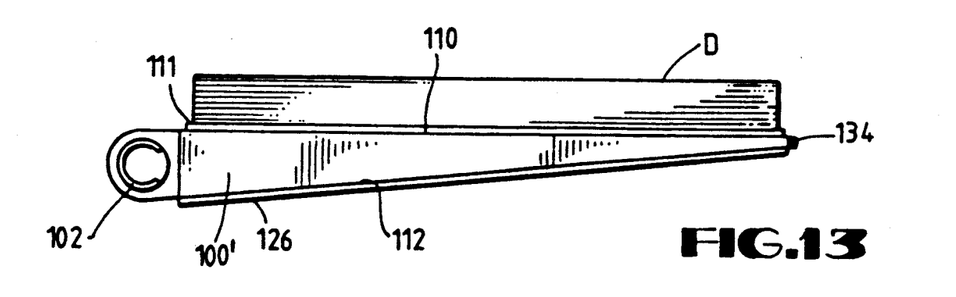
FIG. 13 is an alternative single-source backlighting system according to the present invention; and, FIGS. 14 through 17 are alternative designs for a lamp reflector according to the present invention.

While the design of the light pipe 100 illustrated in FIG. 5 uses lamps at both ends in a dual light source arrangement, light could be provided from only one end in a single source configuration as shown in FIG. 13. The end opposite the light source 102 is then the thinnest portion of the light pipe 100' and a reflective surface 134 is provided to limit losses from the end of the light pipe 100'. The light pipe 100' still has the planar front surface 110, a faceted back surface 112, a reflector plate 126 and a low-loss diffuser 111 and the other variations described above are applicable. The facet pitch and height are preferably varied as previously described to develop greater light redirection to help compensate for the lesser total amount of light supplied by the light source 102.

Figure 18A:
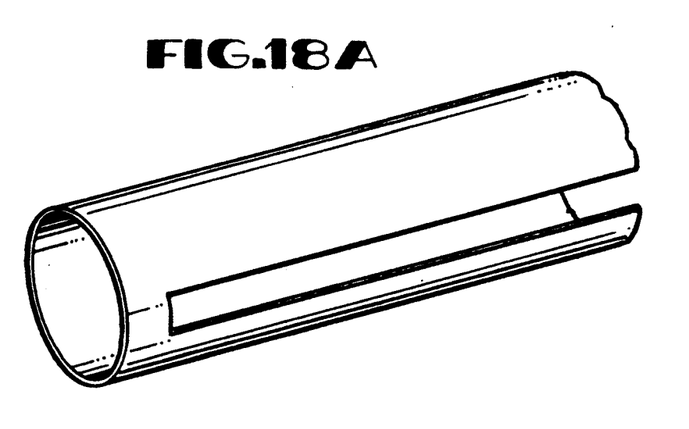
FIGS. 18A, 18B shows two different configurations of apertured fluorescent lamps.

As illustrated in FIG. 18, apertured fluorescent lamps may have a variety of aperture configurations. The strip type aperture of the lamp shown in FIG. 18A provides an approximately rectangular area of increased brightness on the surface of the lamp tube. This type of apertured lamp is commonly used in certain electrophotographic copiers to illuminate the original during the scanning portion of the operation. The dimensions of the aperture may be varied to suit the optical requirements of the particular application. Typically, the most important parameter will be the circumferential dimension of the aperture—i.e., the "arc of the aperture". In the case of relatively small apertures, increasing the arc will provide a greater area of increased brightness on the lamp surface. However, as the area of the aperture increases, the total surface area of phosphor available for fluorescence decreases, thereby limiting the total brightness of the lamp.

Figure 18B:
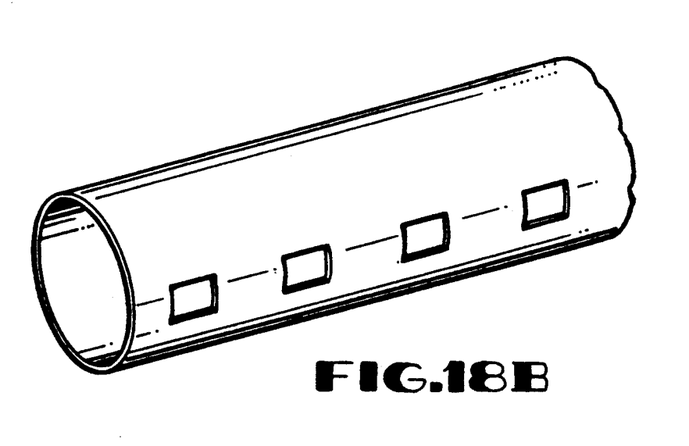

Fluorescent lamps may also be provided with a plurality of discreet apertures. One embodiment of such a lamp is illustrated in FIG. 18B. As is described more fully below, use of this type of apertured lamp is particularly advantageous in certain backlight applications requiring a relatively high degree of light collimation.

Figure 20:
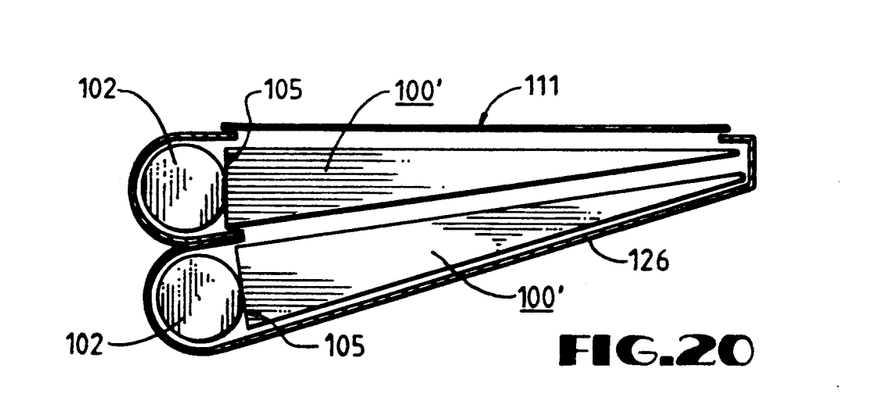
FIG. 20 is a cross-sectional view of an embodiment of the present invention which employs two light pipes and two lamps.

Backlight systems may employ a plurality of faceted light pipes of the present invention so as to provide increased brightness and/or a wider viewing angle. One such embodiment employing two faceted lightpipes 100' and two lamps 102 is shown in FIG. 20. In this embodiment, the faceted light pipes 100' are stacked such that their light admitting ends 105 are on the same side of the backlight. The resulting brightness distribution is similar to the distribution of a backlight system with a single faceted light pipe 100' and it is contemplated that the magnitude of the brightness of the system will be 1.9 times the brightness of a single faceted light pipe system of the type shown in FIG. 13. As with single faceted light pipe systems, a low-scattering diffuser 111 may be advantageously used to avoid moire pattern development in the display. Light from the rear faceted light pipe 100'/lamp combination (i.e. the faceted light pipe 100' which is farther from the display) is directed into the back surface 112 of the faceted light pipe 100' nearer the display D. A rear reflector 126 may be used to redirect light which escapes from the faceted surface 112 of the rear faceted light pipe 100' towards the display. It is contemplated that any of the rear reflector designs disclosed above for the single faceted light pipe systems could be used to advantage in the embodiments shown in FIGS. 20 and 21 which employ dual faceted light pipes 100'. Similarly, a separate injector (like element 104 in the embodiment shown in FIG. 5), index matching material (like element 107 in the embodiment shown in FIG. 5), and/or an insulating relfector around the lamps 102 (like those depicted in FIGS. 14-17) may be used to advantage in these dual faceted light pipe systems in the same manner as that disclosed above for single faceted light pipe backlight systems.

Figure 21:
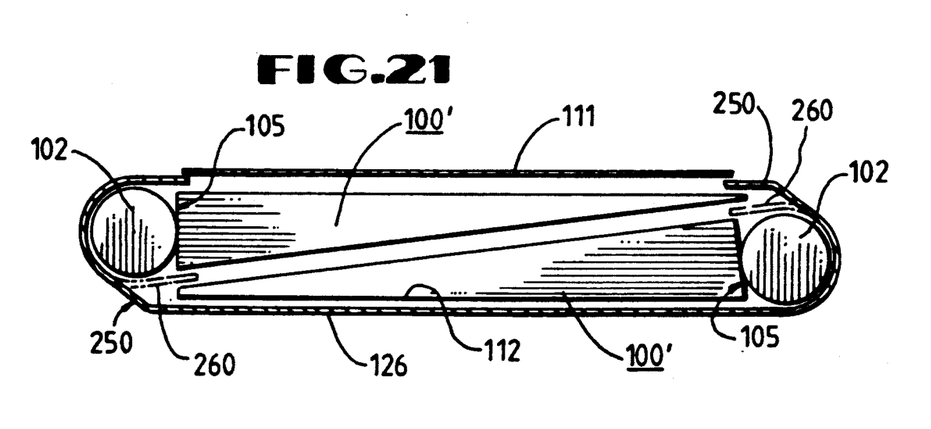
FIG. 21 is a cross-sectional view of an alternative embodiment of the present invention which employs two light pipes and two opposing lamps.

FIG. 21 is a cross-sectional view of a backlight system employing dual faceted light pipes wherein the lamps are situated on opposing sides of the back light system. The faceted light pipes 100' are arranged such that the faceted surface 112 of the rear faceted light pipe 100' is substantially parallel to the display while the faceted surface of the front faceted light pipe 100' is at an oblique angle to the display (as in the embodiments employing a single faceted light pipe). The rear diffuse reflector may be extended so as to wrap around both lamps (as depicted in segment 250 of FIG. 21) or each lamp may be closely coupled to its respective faceted light pipe 100' as shown in dashed segment 260. This particular dual faceted light pipe configuration provides a backlight system with a smaller front-to-back dimension than the embodiment shown in FIG. 20. Additionally, it provides illumination which is less dependent upon viewing angle than either a single faceted light pipe system or the dual faceted light pipe configuration of the system shown in FIG. 20. This feature is illustrated in graphical form in FIG. 22.

Figure 22:
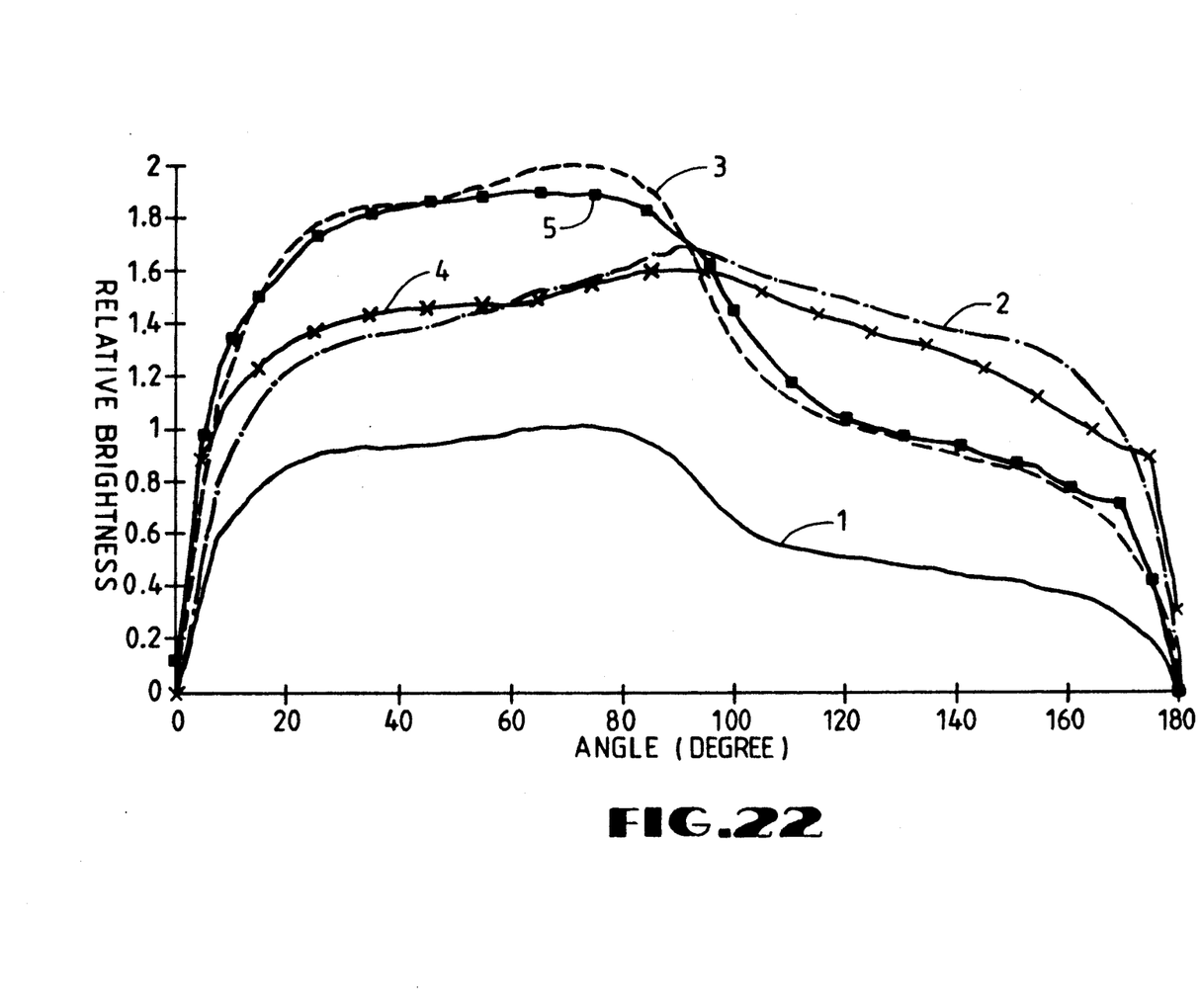
FIG. 22 is a graph depicting the relative brightness of the embodiments illustrated in FIGS. 20 and 21 as a function of viewing angle.

The graph shown in FIG. 22 shows the relative brightness of each of the dual faceted light pipe systems discussed above as a function of viewing angle. A viewing angle of 0 degrees is considered viewing the backlight of FIG. 20 from the side opposite the lamps; a viewing angle of 90 degrees is a perpendicular view; and, a viewing angle of 180 degrees is viewing the backlight from the side having the lamps. The ordinate is normalized to a single faceted light pipe system (such as that depicted in FIG. 13) which is shown as curve #1. Curve #3 is the theoretical output of the system illustrated in FIG. 20 and curve #5 is the measured output of a prototype. It will be noted that curves #3 and #5 have approximately the same angular dependence as a single faceted light pipe device while providing about twice the brightness at any given viewing angle.

Curve #2 is the theoretical output of a backlight having the configuration shown in FIG. 21—i.e., lamps on opposite sides of the backlight system. Curve #4 is the measured output of a prototype having this configuration. The brightness distribution is a symmetrical distribution that is approximately lambertian and the magnitude of the brightness is approximately 1.6 times the brightness of an equivalent single lamp/single faceted light pipe backlight. It should be noted that this embodiment provides more brightness at viewing angles greater than 90 degrees than the embodiment of FIG. 20—i.e., a dual faceted light pipe system having lamps on the same side of the backlight.

Thus, if maximum brightness is required, the system of FIG. 20 will be preferred. If, on the other hand, it is desired to minimize the total depth of the system and/or decrease the angular dependence of the brightness of the display, the dual faceted light pipe system of FIG. 21 will be preferred.

Figure 19:
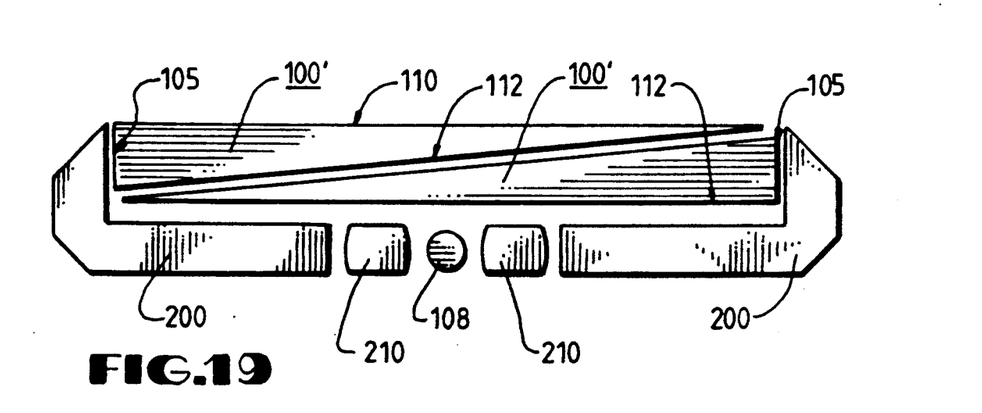
FIG. 19 is a cross-sectional view of an embodiment employing two faceted light pipes illuminated by a single lamp.

FIG. 19 is a cross-sectional view of a single-lamp, dual faceted light pipe backlight system wherein conventional (i.e., nonfaceted) light pipes are used to inject the light from the lamp into the faceted light pipes. In the embodiment illustrated, an apertured lamp having two opposing rows of discreet apertures of the type shown in FIG. 18b is used in conjunction with two opposing arrays of biconvex, aspheric lenses to produce collimated light for injection into the two faceted light pipes of the backlight. Each lens of the array is aligned with an aperture in the lamp. The improved collimation provided by this system (less than about 3 degrees of divergence) is especially useful for the illumination of color LCDs which typically have three layers of liquid crystal light valves with the pixels of each layer in register.

Conventional light pipes 200 each provide two 90-degree turns for the light thereby redirecting the output of the tubular lamp 108 situated at the rear of the system to the opposing light admitting ends 105 of the stacked faceted light pipes 100'. The conventional light pipes 200 are preferably fabricated of PMMA. It is contemplated that other materials commonly used to fabricate conventional light pipes for the transmission of visible light could also be used. If no lenses are used (i.e., the light entering the light pipe is uncollimated), a reflective coating on the conventional light pipes 200 is required. With collimated light, total internal reflectance within conventional light pipe 200 obviates the need for a reflective coating. Also, no diffuser is required on the front of the backlight system if collimated light is used.

As will be apparent to those skilled in the art, application of the present invention is not limited to the illumination of liquid crystal displays. The faceted light pipe of the present invention may be used to advantage in any application which requires a plane of relatively uniform light—e.g., advertising dioramas employing transparencies illuminated from behind, overhead projectors, and the like.

The foregoing description has been directed to particular embodiments of the invention in accordance with the requirements of the U.S. patent statutes for the purposes of illustration and explanation. It will be apparent to those skilled in this art, however, that many modifications and changes in the apparatus and methods set forth will be possible without departing from the scope and spirit of the invention. It is intended that the following claims be interpreted to embrace all such modifications and changes.

What is claimed is:

1. A backlighting system for a liquid crystal display, said system having an illuminated front surface, comprising:
    a first faceted light pipe proximal the illuminated front surface of the backlight having a generally planar front surface for providing light to said illuminated front surface, having a faceted back surface wherein said back surface includes a plurality of generally planar portions parallel to said front surface and a plurality of facets formed at an angle to said front surface and located connecting said back surface parallel portions, and having at least one end surface for receiving light to be transmitted through said front surface;
    a first light source means located adjacent said end surface for receiving light of said first faceted light pipe for providing light to said first light pipe;
    a second faceted light pipe proximal the back surface of the first faceted light pipe having a generally planar front surface situated such that light exiting said front surface enters the back surface of the first faceted light pipe, having a faceted back surface wherein said back surface includes a plurality of generally planar portions parallel to said front surface and a plurality of facets formed at an angle to said front surface and located connecting said back surface parallel portions, and having at least one end surface for receiving light to be transmitted through said front surface; and,
    a second light source means located adjacent said end surface for receiving light of said second faceted light pipe for providing light to said second light pipe.

2. A backlighting system as recited in claim 1 wherein the first light source means and the second light source means are situated on the same side of the backlight.

3. A backlighting system as recited in claim 1 wherein the first light source means and the second light source means are situated on opposing sides of the backlight.

4. A backlighting system for a liquid crystal display, said system having an illuminated front surface, comprising:
    a first faceted light pipe proximal the illuminated front surface of the backlight having a generally planar front surface for providing light to said illuminated front surface, having a faceted back surface wherein said back surface includes a plurality of generally planar portions parallel to said front surface and a plurality of facets formed at an angle to said front surface and located connecting said back surface parallel portions, and having at least one end surface for receiving light to be transmitted through said front surface;
    a first light source means located adjacent said end surface for receiving light of said first faceted light pipe for providing light to said first light pipe;
    a second faceted light pipe proximal the back surface of the first faceted light pipe having a generally planar front surface situated such that light exiting said front surface enters the back surface of the first faceted light pipe, having a faceted back surface wherein said back surface includes a plurality of generally planar portions parallel to said front surface and a plurality of facets formed at an angle to said front surface and located connecting said back surface parallel portions, and having at least one end surface for receiving light to be transmitted through said front surface;
    light source means located adjacent the faceted back surface of the second faceted light pipe; and,
    light transmission means for directing the light from the light source means to the end surfaces for receiving light of the first and second faceted light pipes.

5. A backlighting system as recited in claim 4 wherein the light transmission means is a light pipe.

6. The backlighting system of claim 4 further comprising at least one lens situated between the light source means and the light transmission means.

7. A backlighting system as recited in claim 6 wherein the light source means is an apertured fluorescent lamp having a plurality of discrete apertures and at least one lens is aligned so as to receive and focus light exiting from at least one aperture of the lamp.

* * * * *